(12) United States Patent
Kodama et al.

(10) Patent No.: US 8,922,944 B2
(45) Date of Patent: Dec. 30, 2014

(54) ROTATING DEVICE

(71) Applicant: Alphana Technology Co., Ltd., Shizuoka (JP)

(72) Inventors: Mitsuo Kodama, Shizuoka (JP); Daiki Hayashi, Shizuoka (JP); Takanori Watanabe, Shizuoka (JP); Takuji Yamada, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 0 days.

(21) Appl. No.: 13/749,378

(22) Filed: Jan. 24, 2013

(65) Prior Publication Data
US 2013/0194907 A1   Aug. 1, 2013

(30) Foreign Application Priority Data

Feb. 1, 2012   (JP) ................................ 2012-020153

(51) Int. Cl.
*G11B 19/20*   (2006.01)

(52) U.S. Cl.
CPC .................................. *G11B 19/2009* (2013.01)
USPC ............... 360/99.08; 360/98.07; 310/156.12; 310/216.074

(58) Field of Classification Search
CPC ............. G11B 19/2009; G11B 25/043; G11B 17/038; G11B 19/20; H02K 7/14; H02K 21/22; H02K 3/18; H02K 21/24
USPC .................. 360/98.07, 99.08; 310/90, 156.12, 310/254.1, 216.074, 216.016
See application file for complete search history.

(56) References Cited

U.S. PATENT DOCUMENTS

| | | | | |
|---|---|---|---|---|
| 5,668,427 | A | * | 9/1997 | Morita .................... 310/216.074 |
| 5,822,150 | A | * | 10/1998 | Kelsic ......................... 360/98.07 |
| 5,853,513 | A | * | 12/1998 | Kelsic ......................... 156/89.12 |
| 6,185,067 | B1 | * | 2/2001 | Chamberlain ............. 360/99.08 |
| 6,759,784 | B1 | * | 7/2004 | Gustafson et al. ......... 310/254.1 |
| 6,979,931 | B1 | * | 12/2005 | Gustafson et al. ......... 310/254.1 |
| 7,190,549 | B2 | * | 3/2007 | Byun et al. ................. 360/99.08 |
| 7,355,313 | B2 | * | 4/2008 | Takamatsu et al. .... 310/216.016 |
| 2005/0140220 | A1 | * | 6/2005 | Tsuda et al. ................ 310/67 R |
| 2013/0050871 | A1 | * | 2/2013 | Tamaoka ................... 360/99.08 |

FOREIGN PATENT DOCUMENTS

| | | | |
|---|---|---|---|
| JP | 05274781 A | * | 10/1993 |
| JP | 07029294 A | * | 1/1995 |
| JP | 2008099368 A | * | 4/2008 |
| JP | 2010-205378 A | | 9/2010 |

* cited by examiner

*Primary Examiner* — Will J Klimowicz
(74) *Attorney, Agent, or Firm* — Blank Rome LLP

(57) ABSTRACT

A rotating device includes: a hub that is rotatably supported by a base, on which a recording disk is to be mounted; a stator core fixed to the base, the core having a ring portion and multiple salient poles that radially extend from the ring portion; and a magnet fixed to the hub, the magnet having multiple magnetic poles arranged along its circumference on its side surface on the salient pole side. The magnet is arranged such that its side surface on the salient pole side faces a side surface of each salient pole and a side surface of a portion of the hub that faces the stator core along a rotational axis direction.

14 Claims, 7 Drawing Sheets

100

200

ROTATING DEVICE

BACKGROUND OF THE INVENTION

1. Field of the Invention

The present invention relates to a rotating device configured to rotationally drive a recording disk.

2. Description of the Related Art

Progress is being made in reducing the size and increasing the data capacity of a disk driving apparatus such as a hard disk drive. Such a disk driving apparatus is mounted in various kinds of electronic devices. In particular, progress is being made in mounting such a disk driving apparatus in portable electronic devices such as laptop personal computers, portable music players, and so forth. As conventional techniques, a disk driving apparatus has been proposed as described in Japanese Patent Application Laid Open No. 2010-205378, for example.

Such a disk driving apparatus described in Japanese Patent Application Laid Open No. 2010-205378 employs, as a driving magnet, a magnet mainly composed of rare-earth materials (which will also be referred to as a "rare-earth magnet" hereafter). However, from the viewpoint of the global scarcity of some of these magnetic materials, there is a demand for a technique for contributing to improved resource saving with respect to such magnetic materials. In addition, there is a demand for a technique for further reducing the driving current required to rotationally drive such a rotating device.

In such a situation, there is a demand for a technique for effectively employing such magnetic materials, or otherwise a technique for reducing the driving current required to rotationally drive such a rotating device. However, conventional rotating devices use a large quantity of some kinds of magnetic materials such as rare-earth materials etc., which is contrary to the trend of resource saving. Alternatively, such conventional rotating devices cannot contribute to further reducing the driving current.

SUMMARY OF THE INVENTION

The present invention has been made in view of such a situation. Accordingly, it is a general purpose of the present invention to provide a rotating device which allows magnetic materials to be effectively used, or otherwise a rotating device which allows the driving current to be reduced.

In order to solve the aforementioned problem, a rotating device according to an embodiment of the present invention comprises: a hub that is rotatably supported by a base, on which a recording disk is to be mounted; a core fixed to the base, the core having a ring portion and multiple salient poles that radially extend from the ring portion; and a magnet fixed to the hub, the magnet having multiple magnetic poles arranged along its circumference on its side surface on the salient pole side. The magnet is arranged such that its side surface on the salient pole side faces a surface of each salient pole and a side surface of a portion of the hub that faces the core along a rotational axis direction.

Optional combinations of the aforementioned constituting elements and implementations of the invention in the form of methods, apparatuses, or systems may also be practiced as additional modes of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention but to exemplify the invention. The size of the component in each figure may be changed in order to aid understanding. Some of the components in each figure may be omitted if they are not important for explanation.

A rotating device according an embodiment is suitably employed as a disk driving apparatus such as a hard disk drive configured to mount a magnetic recording disk and to rotationally drive the magnetic recording disk thus mounted.

An outline of a rotating device according to an embodiment is as follows.

A rotating device according to the present embodiment allows magnetic materials to be effectively used. Alternatively, the driving current of the rotating device is reduced. In order to achieve such a purpose, the rotating device has a configuration in which a side surface of a magnet on the stator core side also faces a portion of a hub that faces a stator core along the rotational axis direction, in addition to the salient poles of the stator core. In other words, a ring-shaped recessed portion is formed in a base-side surface of the hub, and the upper end of the magnet is inserted into the recessed portion. Such an arrangement allows the size of the magnet to be increased in the rotational axis direction corresponding to the insertion distance, thereby raising the magnetic flux generated by the magnet. This increases the magnetic flux received by the stator core. As a result, such an arrangement is capable of generating torque with high efficiency. Thus, such an arrangement allows a magnet having a relatively low remanent magnetic flux density such as a ferrite magnet or the like to be employed without increasing the driving current.

First Embodiment

Figure 1:
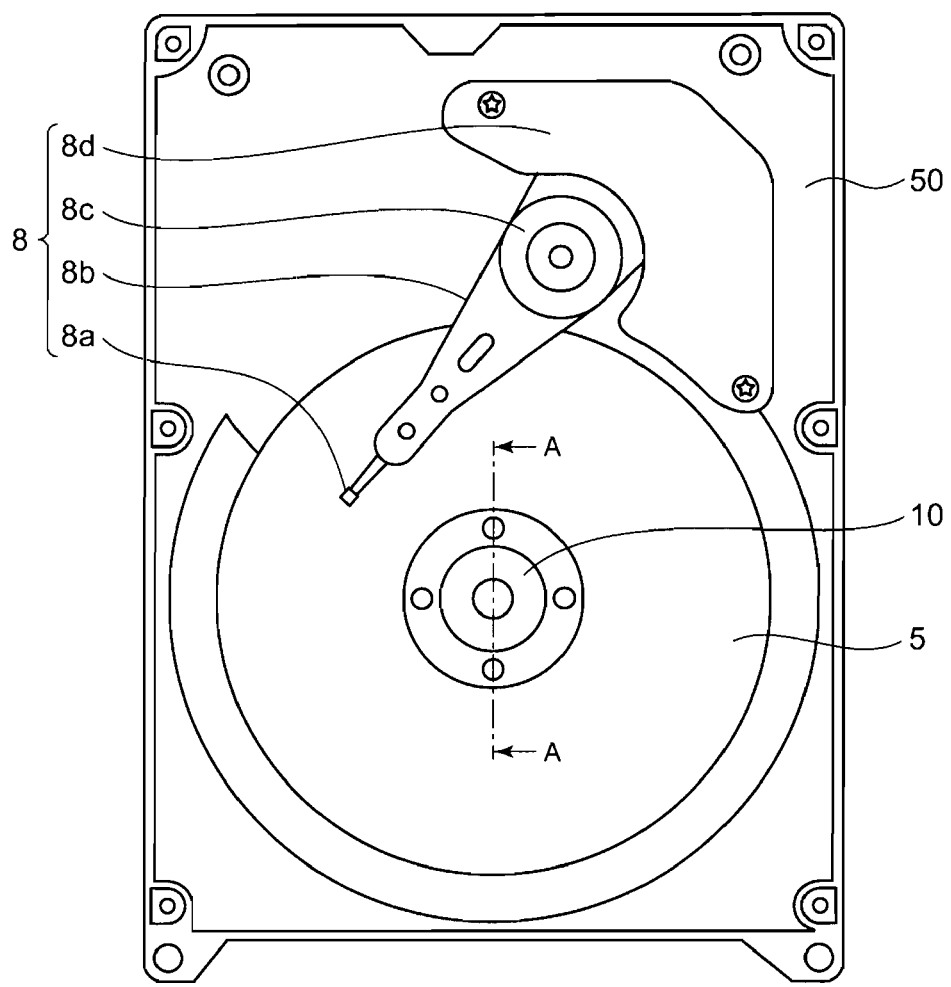
FIG. 1 is a top view of a rotating device according to a first embodiment.

FIG. 1 is a top view of a rotating device 100 according to a first embodiment. FIG. 1 shows the rotating device 100 without a top cover in order to show the internal configuration of the rotating device 100. The rotating device 100 includes a base 50, a hub 10, a recording disk 5, a data read/write unit 8, and a top cover (not shown). Description will be made below with the side on which the hub 10 is mounted on the base 50 as the upper side.

The recording disk 5 is configured as a 3.5-inch magnetic recording disk having a diameter of approximately 95 mm, a central hole having a diameter of 25 mm, and a thickness of 1.27 mm, for example. The recording disk 5 is mounted on the hub 10, and is configured to be rotationally driven by rotating the hub 10.

The base 50 is formed by molding an aluminum alloy material by means of die casting. The base 50 is configured to rotatably support the hub 10 via a bearing described later.

The data read/write unit 8 includes a recording playback head 8a, a swing arm 8b, a pivot assembly 8c, and a voice coil motor 8d. The recording playback head 8a is attached to the tip of the swing arm 8b, and is configured to record data to the recording disk 5, and to read out data from the recording disk 5. The pivot assembly 8c is configured to support the swing arm 8b such that the swing arm 8b can be swung around the rotational axis of the head relative to the base 50. The voice coil motor 8d is configured to swing the swing arm 8b around the rotational axis of the head such that the recording playback head 8a is moved to a desired position above the recording surface of the recording disk 5. The data read/write unit 8 is configured using known techniques for controlling the head position.

Figure 2:
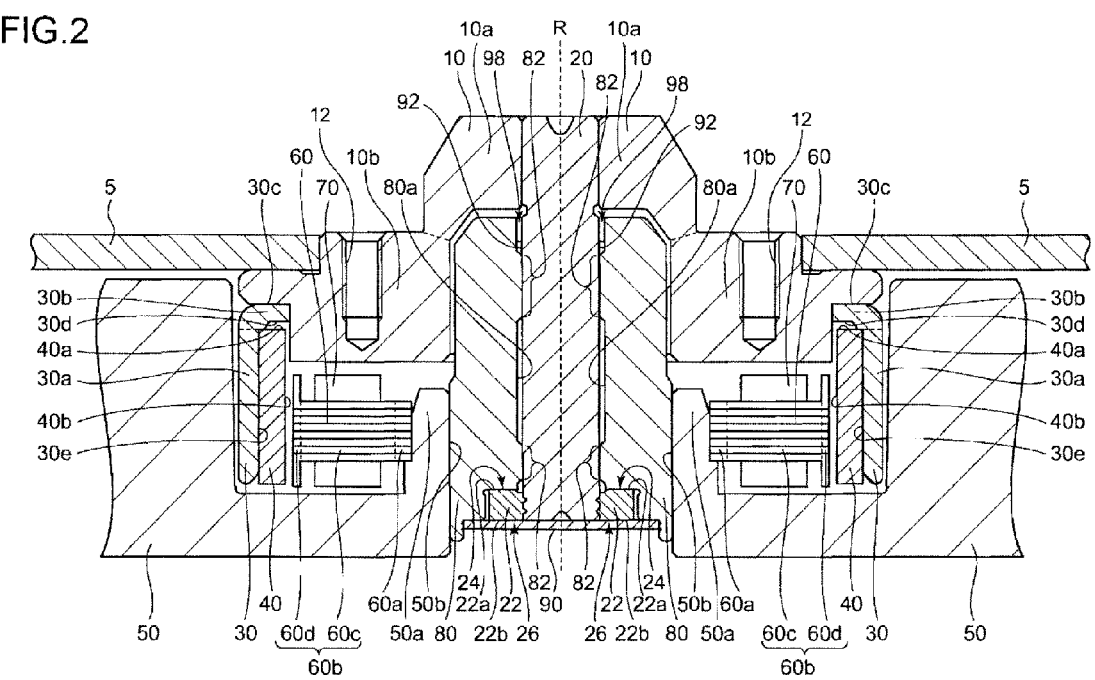
FIG. 2 is a cross-sectional view taken along line A-A in FIG. 1.

FIG. 2 is a cross-sectional view taken along line A-A in FIG. 1. The rotating device 100 includes the hub 10, a shaft 20, a flange 22, a yoke 30, a magnet 40, a base 50, a stator core 60, a coil 70, a sleeve 80, a plate 90, and a lubricant 92.

The hub 10 is formed by cutting a block of material formed by forging a non-magnetic aluminum material. The hub 10 is formed into a convex shape centered on the rotational axis R. The hub 10 has an enclosing portion 10a which encloses the shaft 20 and a cylindrical portion 10b provided to the enclosing portion 10a such that it extends from the lower end of the enclosing portion 10a toward the outer side along the radial direction. Description will be made later with reference to FIG. 2 regarding the structure of the cylindrical portion 10b. The cylindrical portion 10b allows the recording disk 5 to be mounted. Description will also be made later with reference to FIG. 2 regarding the mounting of the recording disk 5.

The yoke 30 is glued onto the lower side of the cylindrical portion 10b. The yoke 30 is formed by pressing a steel plate configured as a soft magnetic material. The yoke 30 is subjected to plating, e.g., nickel plating. The yoke 30 has a cylindrical portion 30a and a flange portion 30b formed such that it extends from the upper end of the cylindrical portion 30a toward the inside along the radial direction. The yoke 30 has an inverted-L-shaped cross-section. The upper surface 30c of the flange portion 30b is glued onto the cylindrical portion 10b.

The magnet 40 is glued onto the inner surface 30e of the cylindrical portion 30a. The magnet 40 is arranged such that its upper end surface 40a faces the lower surface 30d of the flange portion 30b such that there is a partial gap between them. The magnet 40 is formed of ferrite, for example. Furthermore, the magnet 40 is arranged such that its inner surface 40b faces twelve salient poles 60b of the stator core 60 along the radial direction. The magnet 40 is configured such that sixteen magnetic poles are formed on the inner surface 40b thereof along its circumferential direction. Furthermore, surface processing is performed on the surface of the magnet 40 such as polymer coating or the like. Typically, such magnets have a brittle surface, which leads to a problem of the generation of particles due to peeling off from the surface. By providing such surface processing, such an arrangement is capable of preventing such a problem.

The upper end of the shaft 20 is inserted into the enclosing portion 10a of the hub 10, and is fixed to the hub 10 by means of press fitting and glue. The flange 22 having a ring-shape is press fitted to the lower end of the shaft 20.

A ring-shaped protrusion portion 50a is provided to the base 50 such that it protrudes toward the upper side with the rotational axis R as the center. The ring-shaped protrusion portion 50a is configured to have a cylindrical shape with the rotational axis R as the center. The inner surface of the ring-shaped protrusion portion 50a defines the bearing hole 50b. The sleeve 80 is glued into the bearing hole 50b. A through hole 80a is formed in the sleeve 80, which allows the shaft 20 to be mounted. The plate 90 is fixed to the lower end of the sleeve 80.

The lubricant 92 is injected into the gap between the combination of the shaft 20 and the flange 22 and the combination of the sleeve 80 and the plate 90. The shaft 20, the flange 22, the lubricant 92, the sleeve 80, and the plate 90 function as a bearing unit configured to rotatably support the hub 10. That is to say, the base 50 is configured to rotatably support the hub 10 via the bearing unit. The bearing unit is fixed to the bearing hole 50b of the base 50.

A pair of radial dynamic pressure grooves 82, each configured as a herringbone groove, is formed on the surface of the through hole 80a of the sleeve 80 such that the grooves are arranged separated from each other along the vertical direction. Furthermore, a first thrust dynamic pressure groove 24 configured as a herringbone groove is formed on the upper surface 22a of the flange 22. Moreover, a second thrust dynamic pressure groove 26 configured as a herringbone groove is formed on the lower surface 22b of the flange 22. In the rotating operation of the rotating device 100, the hub 10 and the shaft 20 are supported along the radial direction and the rotational axis R direction by means of dynamic pressure generated by the lubricant 92 in the dynamic pressure grooves.

The open end of the sleeve 80 forms a capillary sealing portion 98 having a tapered structure configured such that the gap between the surface of the through hole 80a and the outer surface of the shaft 20 gradually extends outward as it approaches the upper side. The capillary sealing portion 98 is configured to prevent the lubricant 92 from leaking due to the capillary action.

The stator core 60 has a ring portion 60a and the twelve salient poles 60b each extending from the ring portion 60a portion 60a toward the outer side along the radial direction, and is fixed to the ring-shaped protrusion portion 50a of the base 50 by means of press fitting or otherwise by a running fit. The stator core 60 is formed by laminating eight thin magnetic steel sheets and mechanically integrating them. The surface of the stator core 60 is subjected to insulation coating by means of electro deposition, powder coating, or the like. The twelve salient poles 60b each have an intermediate portion 60c that extends from the ring portion 60a toward the outer side along the radial direction and an end portion 60d provided on the side opposite to the ring portion 60a. A coil 70 is provided to each intermediate portion 60c. By applying a three-phase driving current having an approximately sinusoidal waveform, such an arrangement provides a driving magnetic flux along each salient pole 60b.

Figure 3:
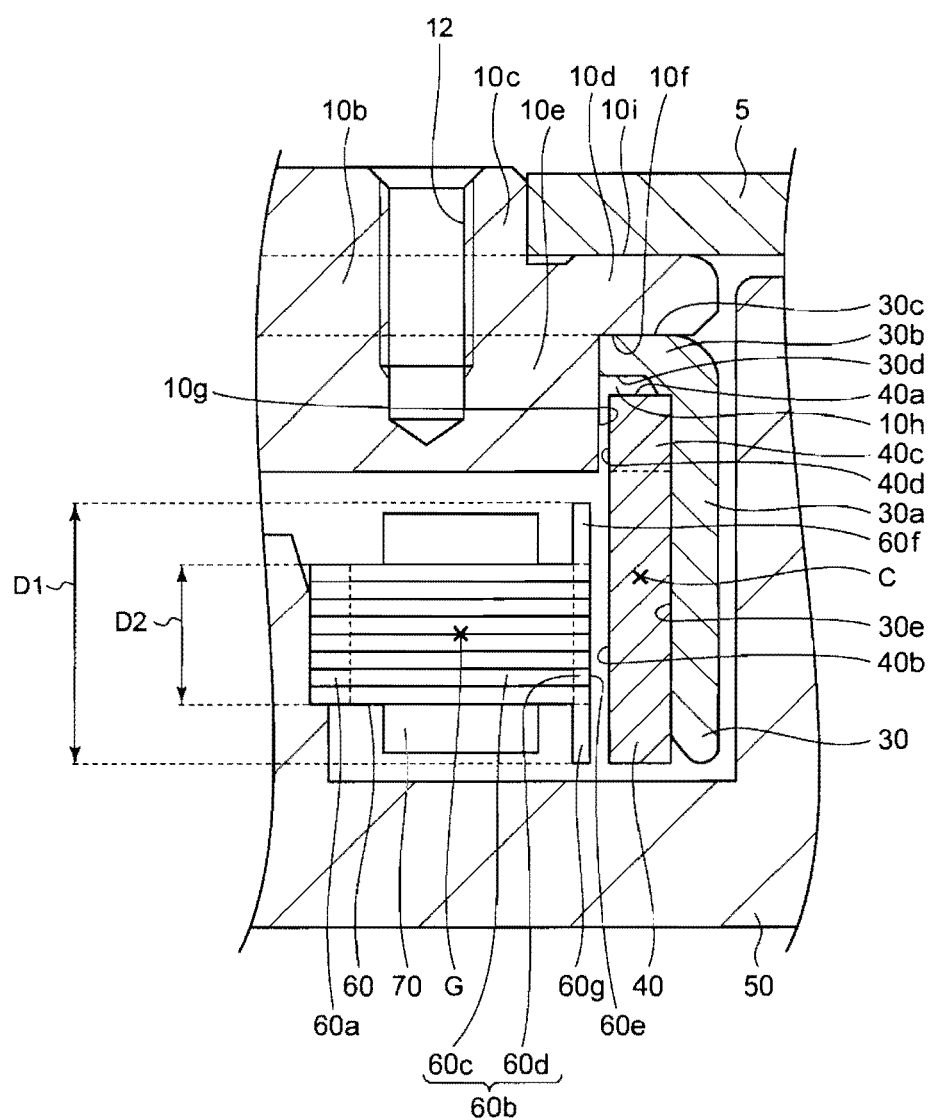
FIG. 3 is an enlarged cross-sectional view showing an enlargement of the magnet, and one salient pole and those surroundings, shown in FIG. 2.

FIG. 3 is an enlarged cross-sectional view showing an enlargement of the magnet 40, and one salient pole 60b and those surroundings, shown in FIG. 2. The cylindrical portion 10b of the hub 10 has a small-diameter portion 10c on its upper side, and a large-diameter portion 10d on the lower side of the small-diameter portion 10c, which is formed such that it has a larger diameter than that of the small-diameter portion 10c. Furthermore, the cylindrical portion 10b has a medium-diameter portion 10e on the lower side of the large-diameter portion 10d, which is formed such that it has a larger diameter than that of the small-diameter portion 10c, and such that it has a smaller diameter than that of the large-diameter portion 10d. It should be noted that the size relation between the diameter of the small-diameter portion 10c and the diameter of the medium-diameter portion 10e is reversible.

By engaging the central hole of the recording disk 5 with the small-diameter portion 10c, the recording disk 5 can be mounted on the upper surface 10i of the large-diameter portion 10d. The upper surface 30c of the flange portion 30b of the yoke 30 is glued onto the lower surface 10f of the large-diameter portion 10d.

One or more screws, which are respectively screwed in screw holes 12, press, e.g., a clamper (not shown) against the upper surface of the small-diameter portion 10c of the hub 10. As such, the recording disk 5 is made secure against the upper surface 10i of the large-diameter portion 10d.

The outer surface 10g of the medium-diameter portion 10e and the lower surface 10f of the large-diameter portion 10d define a ring-shaped recessed portion 10h that is recessed from the lower outer edge of the cylindrical portion 10b toward the upper side along the rotational axis R. A first insertion portion 40c configured as an upper end portion of the magnet 40 is inserted up to the ring-shaped recessed portion 10h. Thus, the inner surface 40d of the first insertion portion 40c faces, along the radial direction, the outer surface 10g of the medium-diameter portion 10e, which is a portion of the hub 10 that faces the stator core 60 along the rotational axis R. That is to say, the inner surface 40b of the magnet 40 is arranged such that it faces the outer surface 10g of the medium-diameter portion 10e along the radial direction, in addition to the end surface 60e of each salient pole 60b.

The stator core 60 is formed such that the size D1 of the end portion 60d along the rotational axis R direction is greater than the size D2 of the intermediate portion 60c along the rotational axis R direction. A portion 60f that protrudes from the end portion 60d toward the hub 10 side as viewed from the intermediate portion 60c is formed by bending the topmost layer steel sheet upward by pressing. Similarly, a portion 60g that protrudes toward the base 50 side is formed by bending the bottommost layer steel sheet downward.

With the present embodiment, the center C of the magnet 40 along the rotational axis R is positioned closer to the hub 10 side than the position of the center of gravity G of the intermediate portion 60c. That is to say, the magnet 40 is arranged asymmetrically with respect to a plane that passes through the center of gravity G of the intermediate portion 60c and that is orthogonal to the rotational axis R. As described above, such an arrangement allows the position of the magnet 40 along the rotational axis direction to be designed independent of the position of the intermediate portion 60c. Thus, such an arrangement allows the designer to arrange these components at optimum respective positions.

Description will be made regarding the operation of the rotating device 100 configured described above. In order to rotationally drive the recording disk 5, a three-phase driving current is supplied to the coil 70. A magnetic flux is generated along the twelve salient poles by flowing the driving current through the coil 70. The magnet 40 receives torque generated by the attraction and repulsion due to the magnetic flux generated along the twelve salient poles and the magnetic flux generated by the magnet 40, thereby rotating the hub 10 and the recording disk 5 that is engaged with the hub 10. In this stage, the voice coil motor 8d swings the swing arm 8b, which allows the recording playback head to be moved in a swinging range over the recording disk 5. The recording playback head converts the magnetic data recorded on the recording disk 5 into an electric signal, and transmits the electric signal thus converted to a control board (not shown). Alternatively, the recording playback head receives the data transmitted in the form of an electric signal from the control board, and writes the data thus received on the recording disk 5 in the form of magnetic data.

With the rotating device 100 according to the present embodiment, the first insertion portion 40c of the magnet 40 is inserted into the ring-shaped recessed portion 10h formed at the outer edge of the lower end of the cylindrical portion 10b of the hub 10. Thus, such an arrangement allows the size of the magnet 40 to be increased along the rotational axis R direction corresponding to the size of the first insertion portion 40c, thereby increasing the magnetic flux generated by the magnet 40. This increases the magnetic flux received by the stator core 60. As a result, such an arrangement allows the torque to be generated with high efficiency. That is to say, such an arrangement allows greater torque to be generated using the same driving current, as compared with an arrangement that does not employ such a first insertion portion 40c. Thus, such an arrangement allows a magnet having a relatively low remanent magnetic flux density such as a ferrite magnet to be employed to provide the same torque as that provided by an arrangement employing a rare-earth magnet without the need to increase the driving current.

The stator core 60 is formed such that the size D1 of the end portion 60d along the rotational axis R direction is greater than the size D2 of the intermediate portion 60c along the rotational axis R direction. This allows the area of the end surface 60e, which receives the magnetic flux from the magnet 40, to be increased without changing the number of turns of the coil 70 provided to the intermediate portion 60c, as compared with an arrangement in which the size D1 is the same as the size D2. As a result, such an arrangement allows the torque to be generated with high efficiency. That is to say, such an arrangement is capable of generating greater torque using the same driving current, as compared with an arrangement in which the size D1 is equal to the size D2. Thus, such an arrangement allows a magnet having a relatively low remanent magnetic flux density such as a ferrite magnet to be employed to provide the same torque as that provided by an arrangement employing a rare-earth magnet without the need to increase the driving current.

The upper surface 30c of the flange portion 30b of the yoke 30 configured to support the magnet 40 is in contact with the lower surface 10f of the large-diameter portion 10d of the hub 10. Thus, such an arrangement provides high-precision positioning of the yoke 30, i.e., high-precision positioning of the magnet 40, along the rotational axis R direction.

Second Embodiment

The major point of difference between the rotating device 100 according to the first embodiment and a rotating device 200 according to a second embodiment is the position relation between the base and the magnet. With the second embodiment, a ring-shaped recessed portion 50c is provided to the base 50. The lower end of the magnet 40 is inserted into the ring-shaped recessed portion 50c.

Figure 4:
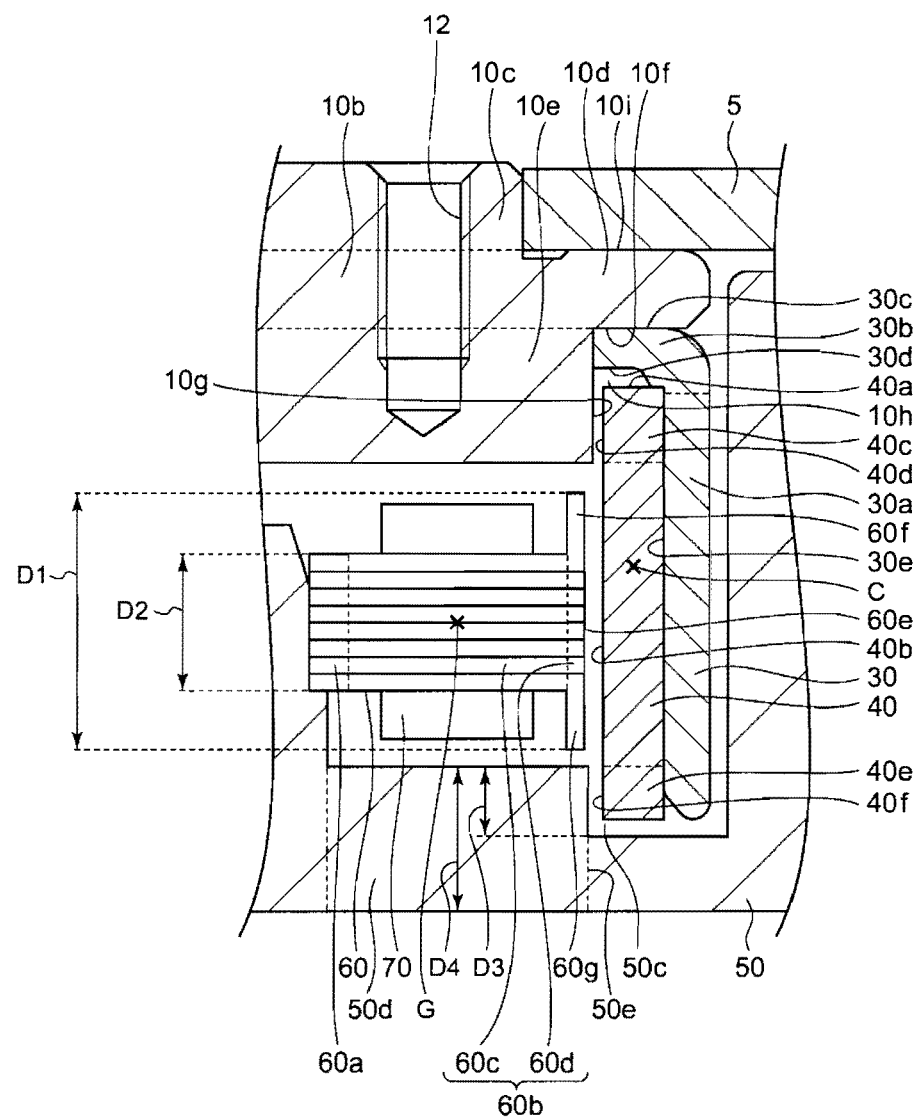
FIG. 4 is an enlarged cross-sectional view showing an enlargement of the magnet, and one salient pole and those surroundings, included in a rotating device according to a second embodiment.

FIG. 4 is an enlarged cross-sectional view showing an enlargement of a part of the rotating device 200 according to the second embodiment, i.e., the magnet 40, and one salient pole 60b and those surroundings. FIG. 4 corresponds to FIG. 3.

The base 50 has the ring-shaped recessed portion 50c configured recessed downward along the rotational axis R direction such that it faces the magnet 40 along the rotational axis R direction. In order to secure the strength of the base, the ring-shaped recessed portion 50c is formed to have a depth D3 which is equal to or smaller than half the thickness D4 of the portion 50d that faces the stator core 60 along the rotational axis R direction. A second insertion portion 40e defined as a lower end portion of the magnet 40 is inserted into the ring-shaped recessed portion 50c. Thus, the inner surface 40f of the second insertion portion 40e faces the side surface 50e of the portion 50d, which is a portion of the base 50 that faces the stator core 60 along the rotational axis R direction. That is to say, the inner surface 40b of the magnet 40 faces the side surface 50e of the portion 50d along the radial direction, in addition to the end surface 60e of each salient pole 60b and the outer surface 10g of the medium-diameter portion 10e.

The rotating device 200 according to the present embodiment provides the same functions and effects as those provided by the rotating device 100 according to the first embodiment. In addition, with the rotating device 200 according to the present embodiment, the second insertion portion 40e of the magnet 40 is inserted into the ring-shaped recessed portion 50c formed in the base 50. Thus, such an arrangement allows the size of the magnet 40 to be further increased along the rotational axis R direction corresponding to the size of the second insertion portion 40e as compared with the first embodiment, thereby allowing the torque to be generated with higher efficiency.

Third Embodiment

The major point of difference between the rotating device 100 according to the first embodiment and a rotating device 300 according to a third embodiment is the position relation between the base and the magnet and the structure of the end portion of each salient pole. With the third embodiment, a ring-shaped recessed portion 350c is provided to the base 50. The lower end of the magnet 40 is inserted into the ring-shaped recessed portion 350c. Furthermore, the respective end portions 360d of each salient pole 60b are inserted into the ring-shaped recessed portion 10h and the ring-shaped recessed portion 350c, respectively.

Figure 5:
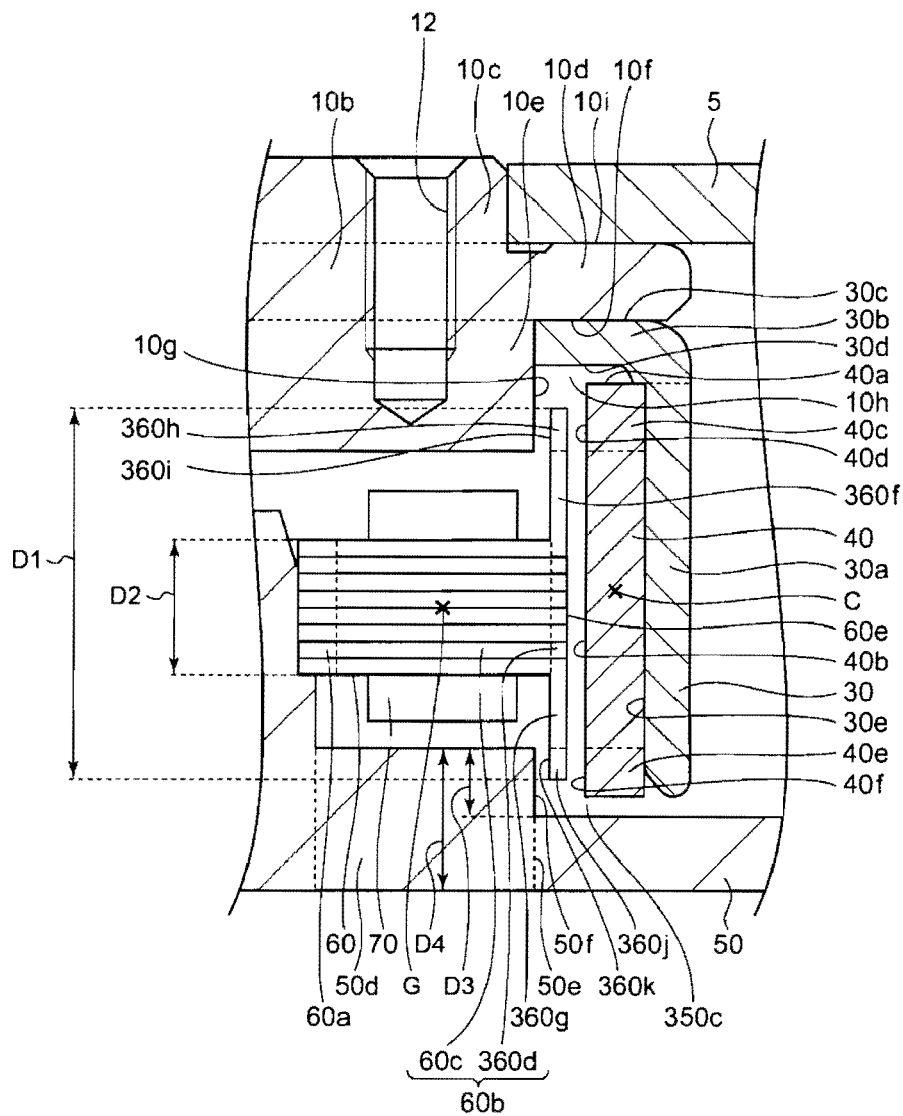
FIG. 5 is an enlarged cross-sectional view showing an enlargement of the magnet, and one salient pole and those surroundings, included in a rotating device according to a third embodiment.

FIG. 5 is an enlarged cross-sectional view showing an enlargement of the magnet 40, and one salient pole 60b and those surroundings, included in the rotating device 300 according to the third embodiment. FIG. 5 corresponds to FIG. 3.

A first insertion portion 360h, which is one of the respective end portions 360d of each salient pole 60b and which is configured as an upper end portion of a portion 360f that protrudes toward the hub 10 side as viewed from the intermediate portion 60c, is inserted into the ring-shaped recessed portion 10h of the hub 10. Specifically, the first insertion portion 360h is inserted into a space between the inner surface 40d of the first insertion portion 40c of the magnet 40 and the outer surface 10g of the medium-diameter portion 10e. Thus, the inner surface 360i of the first insertion portion 360h faces the outer surface 10g of the medium-diameter portion 10e along the radial direction.

The second insertion portion 40e of the magnet 40 is inserted into the ring-shaped recessed portion 350c of the base 50. Thus, the inner surface 40f of the second insertion portion 40e faces the side surface 50e of the portion 50d of the base 50 along the radial direction. Furthermore, a second insertion portion 360j, which is the other one of the respective end portions 360d of each salient pole 60b and which is configured as a lower end portion of a portion 360g that protrudes toward the base 50 side as viewed from the intermediate portion 60c, is inserted into the ring-shaped recessed portion 350c. Specifically, the second insertion portion 360j is inserted into a space between the inner surface 40f of the second insertion portion 40e of the magnet 40 and the side surface 50f of the ring-shaped recessed portion 50c. Thus, an inner surface 360k of the second insertion portion 360j faces the side surface 50e of the portion 50d along the radial direction.

It should be noted that description has been made regarding an example in which the respective end portions 360d of each salient pole 60b are inserted into the ring-shaped recessed portion 10h and the ring-shaped recessed portion 350c. Also, one of the respective end portions 360d may be inserted into either of the ring-shaped recessed portion 10h or the ring-shaped recessed portion 350c. That is to say, an arrangement may be made in which the end portion 360d of each salient pole 60d is inserted into the ring-shaped recessed portion 10h such that the inner surface 360i of the first insertion portion 360h faces the outer surface 10g of the medium-diameter portion 10e along the radial direction. Otherwise, an arrangement may be made in which the end portion 360d of each salient pole 60b is inserted into the ring-shaped recessed portion 350c such that the inner surface 360k of the second insertion portion 360j faces the side surface 50e of the portion 50d along the radial direction.

The rotating device 300 according to the present embodiment provides the same functions and effects as those provided by the rotating device 100 according to the first embodiment. In addition, with the rotating device 300 according to the present embodiment, the second insertion portion 40e of the magnet 40 is inserted into the ring-shaped recessed portion 350c formed in the base 50. Thus, such an arrangement allows the size of the magnet 40 to be increased along the rotational axis R direction corresponding to the size of the second insertion portion 40e, as compared with the first embodiment, thereby allowing the torque to be generated with higher efficiency.

The first insertion portion 360h of the end portion 360d is inserted into the ring-shaped recessed portion 10h, and the second insertion portion 360j is inserted into the ring-shaped recessed portion 350c. Thus, such an arrangement allows the area of the end surface 60e, which receives the magnetic flux from the magnet 40, to be increased corresponding to the size of the first insertion portion 360h and the size of the second insertion portion 360j, as compared with the first embodiment. As a result, such an arrangement is capable of generating the torque with high efficiency.

Fourth Embodiment

The major point of difference between a rotating device 400 according to a fourth embodiment and the rotating device 300 according to the third embodiment is the presence or absence of a yoke.

Figure 6:
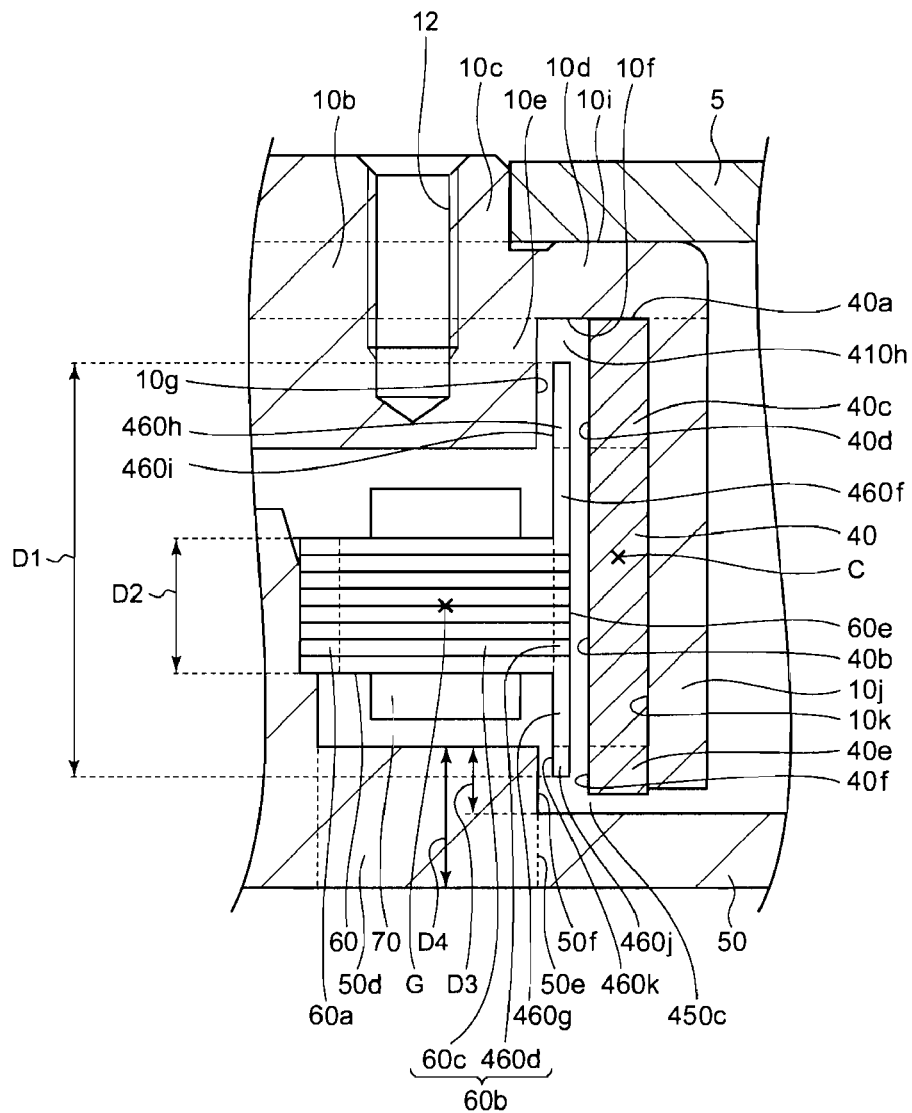
FIG. 6 is an enlarged cross-sectional view showing an enlargement of the magnet, and one salient pole and those surroundings, included in a rotating device according to a fourth embodiment.

FIG. 6 is an enlarged cross-sectional view showing an enlargement of the magnet 40, and one salient pole 60b and those surroundings, included in the rotating device 400 according to the fourth embodiment. FIG. 6 corresponds to FIG. 5.

The hub 10 according to the present embodiment is formed of a steel material configured as a soft magnetic material such as SUS430F or the like. The hub 10 is formed by, for example, pressing or cutting a steel plate. The hub 10 is configured to further have a ring-shaped wall portion 10*j* connected to the large-diameter portion 10*d* of the cylindrical portion 10*b* such that it extends along the rotational axis R direction. The magnet 40 is glued onto an inner surface 10*k* of the ring-shaped wall portion 10*j*. The ring-shaped wall portion 10*j* functions as a yoke. Thus, the present embodiment does not require a yoke.

The first insertion portion 40*c* of the magnet 40 is inserted into a ring-shaped recessed portion 410*h* surrounded by the outer surface 10*g* of the medium-diameter portion 10*e*, the lower surface 10*f* of the large-diameter portion 10*d*, and the inner surface 10*k* of the ring-shaped wall portion 10*j*. The upper end surface 40*a* of the magnet 40 is glued onto the lower surface 10*f* of the large-diameter portion 10*d*. That is to say, the magnet 40 is arranged such that its upper end surface 40*a* is in contact with the hub 10. The inner surface 40*d* of the first insertion portion 40*c* faces, along the radial direction, the outer surface 10*g* of the medium-diameter portion 10*e* which is a portion of the hub 10 that faces the stator core 60 along the rotational axis R direction.

The rotating device 400 according to the present embodiment provides the same functions and effects as those provided by the rotating device 300 according to the third embodiment. In addition, with the rotating device 400 according to the present embodiment, the upper end surface 40*a* of the magnet 40 is in contact with the lower surface 10*f* of the large-diameter portion 10*d*. That is to say, there is no flange portion of the yoke between the magnet 40 and the large-diameter portion 10*d*. Thus, by eliminating such a flange portion, such an arrangement allows the size of the magnet 40 to be further increased along the rotational axis R direction, as compared with the third embodiment. As a result, such an arrangement is capable of generating torque with high efficiency.

Fifth Embodiment

The major point of difference between a rotating device 500 according to a fifth embodiment and the rotating device 100 according to the first embodiment is the structure of the magnet.

Figure 7:
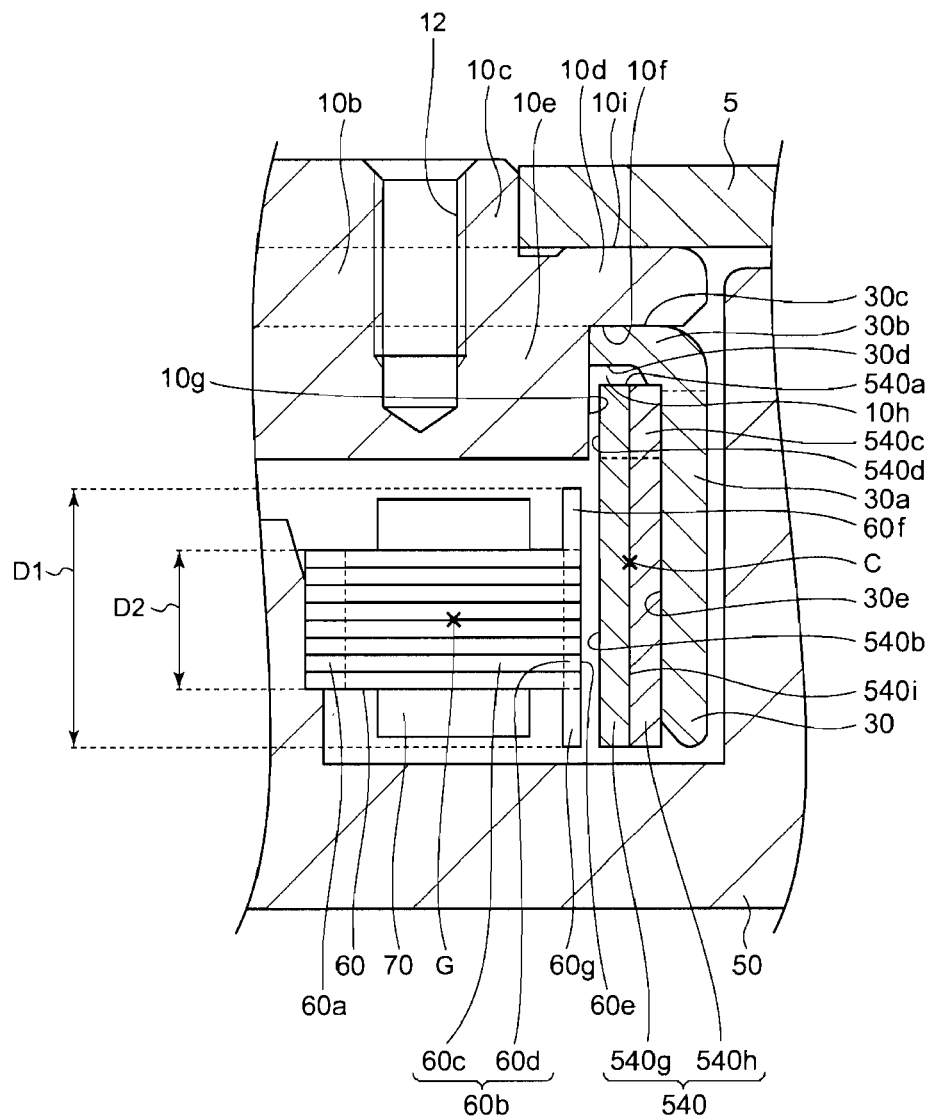
FIG. 7 is an enlarged cross-sectional view showing an enlargement of the magnet, and one salient pole and those surroundings, included in a rotating device according to a fifth embodiment.

FIG. 7 is an enlarged cross-sectional view showing an enlargement of a magnet 540, and one salient pole 60*b* and those surroundings, included in the rotating device 500 according to the fifth embodiment. FIG. 7 corresponds to FIG. 3.

The magnet 540 includes a ring-shaped first layer 540*g* arranged such that it faces the end surface 60*e* of each salient pole 60*b*, and a ring-shaped second layer 540*h* connected to the side surface 540*i* of the first layer 540*g* that is opposite to each salient pole 60*b*. The first layer 540*g* is formed of rare-earth materials such as neodymium, iron, boron, etc. The second layer 540*h* is formed of ferrite. That is to say, the first layer 540*g* arranged such that it faces the end surface 60*e* of each salient pole 60*b* is formed of a magnetic material having a remanent magnetic flux density that is higher than the magnetic material that forms the second layer 540*h*.

The rotating device 500 according to the present embodiment provides the same functions and effects as those provided by the rotating device 100 according to the first embodiment. In addition, with the rotating device 500 according to the present embodiment, the magnet 540 includes the first layer 540*g* arranged such that it faces the end surface 60*e* of each salient pole 60*b* and the second layer 540*h* connected to the side surface 540*i* of the first layer 540*g* that is opposite to each salient pole 60*b*. The first layer 540*g* is configured as a rare-earth magnet having a relatively high remanent magnetic flux density, and the second layer 540*h* is formed as a ferrite magnet having a relatively low remanent magnetic flux density. As described above, by configuring a part of the magnet as a rare-earth magnet, such an arrangement allows the magnitude of the magnetic flux generated by the magnet 540 to be increased, as compared with an arrangement in which the entire region of the magnet is formed as a ferrite magnet alone. As a result, such an arrangement is capable of generating torque with high efficiency, as compared with an arrangement in which the entire region of the magnet is formed as a ferrite magnet alone. Furthermore, by configuring a part of the magnet as a low-cost ferrite magnet, such an arrangement provides reduced costs required for the magnet, as compared with an arrangement in which the entire region of the magnet is configured as a rare-earth magnet.

Description has been made regarding the configurations and the operations of the rotating devices according to the embodiments. The above-described embodiments have been described for exemplary purposes only, and are by no means intended to be interpreted restrictively. Rather, it can be readily conceived by those skilled in this art that various modifications may be made by making various combinations of the aforementioned components, which are also encompassed in the technical scope of the present invention.

Description has been made in the first through fifth embodiments regarding a so-called outer rotor type rotating device having a configuration in which the magnet 40 is arranged on the outer side of the stator core 60. However, the present invention is not restricted to such an arrangement. For example, the present invention may be applied to a so-called inner rotor type rotating device having a configuration in which the magnet 40 is arranged on the inner side of the stator core 60. In this case, the ring-shaped recessed portions formed in the hub and/or the base are each arranged on the inner side of the stator core, and the magnet is inserted into the ring-shaped recessed portion thus formed.

The present modification provides the same functions and effects as those provided by the rotating device 100 according to the first embodiment.

Description has been made in the first through fifth embodiments regarding an integrated rotating device having a configuration in which the base rotatably supports the hub. However, the present invention is not restricted to such an arrangement. For example, a motor according to the present embodiment may be manufactured separately, and the motor thus manufactured may be mounted on a chassis.

Description has been made in the first through fifth embodiments regarding an arrangement in which a lamination core is employed as the stator core 60. However, the stator core 60 is not restricted to such a lamination core.

Description has been made in the first through fourth embodiments regarding an arrangement in which the magnet is configured as a ferrite magnet. However, the present invention is not restricted to such an arrangement. For example, as with conventional techniques, the magnet 40 may be configured as a rare-earth magnet formed of rare-earth materials such as neodymium, iron, boron, etc. In this case, such an arrangement allows the driving current to be reduced while maintaining the rotating torque on the same order as that in conventional techniques.

What is claimed is:
1. A rotating device comprising:
   a hub that is rotatably supported by a base, on which a recording disk is to be mounted;

a core fixed to the base, the core having a ring portion and multiple salient poles that radially extend from the ring portion; and a magnet fixed to the hub, the magnet having multiple magnetic poles arranged along its circumference on its side surface on the salient pole side, wherein the magnet is arranged such that its side surface on the salient pole side faces a side surface of each salient pole and a side surface of a portion of the hub that faces the core along a rotational axis direction, and the hub has a screw hole in the portion that axially faces the core, and a region occupied by the screw hole at least partially overlaps in a radial direction a region occupied by the magnet.

2. The rotating device according to claim 1, further comprising a yoke configured to support the magnet, wherein the yoke has a cylindrical portion that extends along the rotational axis and a flange portion provided to an end portion of the cylindrical portion on the hub side such that it extends inward along the radial direction, and wherein a hub side surface of the flange portion is in contact with the hub, and a base side surface of the flange portion faces an end surface of the magnet, with a gap between the flange portion and the magnet.

3. The rotating device according to claim 1, wherein an end surface of the magnet on the hub side is in contact with the hub.

4. The rotating device according to claim 1, wherein at least one of the multiple salient poles has an intermediate portion around which a coil is wound, and an end portion provided to a side of the intermediate portion that is opposite to the ring portion, and wherein the end portion is configured such that its size along the rotational axis direction is greater than a size of the intermediate portion along the rotational axis direction.

5. The rotating device according to claim 4, wherein a side surface of the end portion faces a side surface of a portion of the base that faces the core along the rotational axis direction.

6. The rotating device according to claim 1, wherein one end of the magnet is inserted into a ring-shaped recessed portion formed at a hub side surface of the base.

7. The rotating device according to claim 6, wherein the ring-shaped recessed portion formed in the base is configured to have a depth that is at most equal to half a thickness of a portion of the base that faces the core along the rotational axis direction.

8. The rotating device according to claim 1, wherein the magnet comprises a first layer having a ring shape that faces the side surface of the core, and a second layer having a ring shape connected to a side surface of the first layer that is opposite to the core, and wherein the first layer is formed of a magnetic material having a remanent magnetic flux density that is higher than that of a magnetic material that forms the second layer.

9. The rotating device according to claim 1, wherein the magnet is formed of a ferrite magnet.

10. The rotating device according to claim 1, wherein the magnet has a portion formed of a ferrite magnet and a portion formed of a rare-earth magnet.

11. A rotating device comprising:

a hub that is rotatably supported by a base, on which a recording disk is to be mounted;

a core fixed to the base, the core having a ring portion and multiple salient poles that radially extend from the ring portion, a coil being wound around the salient poles; and a magnet fixed to the hub, the magnet having multiple magnetic poles arranged along its circumference on its side surface on the salient pole side, wherein, with a direction in which the hub is provided to the base in a rotational axis direction as an upper direction, an upper surface of the magnet is positioned above a portion of the hub that faces the coil, and the hub has a screw hole in the portion that axially faces the core, and a region occupied by the screw hole at least partially overlaps in a radial direction a region occupied by the magnet.

12. The rotating device according to claim 11, further comprising a yoke configured to support the magnet, wherein the yoke has a cylindrical portion that extends along the rotational axis and a flange portion provided to an end portion of the cylindrical portion on the hub side such that it extends inward along the radial direction, and wherein a hub side surface of the flange portion is in contact with the hub, and a base side surface of the flange portion faces an end surface of the magnet, with a gap between the flange portion and the magnet.

13. The rotating device according to claim 11, wherein at least one of the multiple salient poles has an intermediate portion around which the coil is wound, and an end portion provided to a side of the intermediate portion that is opposite to the ring portion, and wherein the end portion is configured such that its size along the rotational axis direction is greater than a size of the intermediate portion along the rotational axis direction.

14. The rotating device according to claim 11, wherein the magnet is formed of a ferrite magnet.

* * * * *